Patented Oct. 27, 1925.

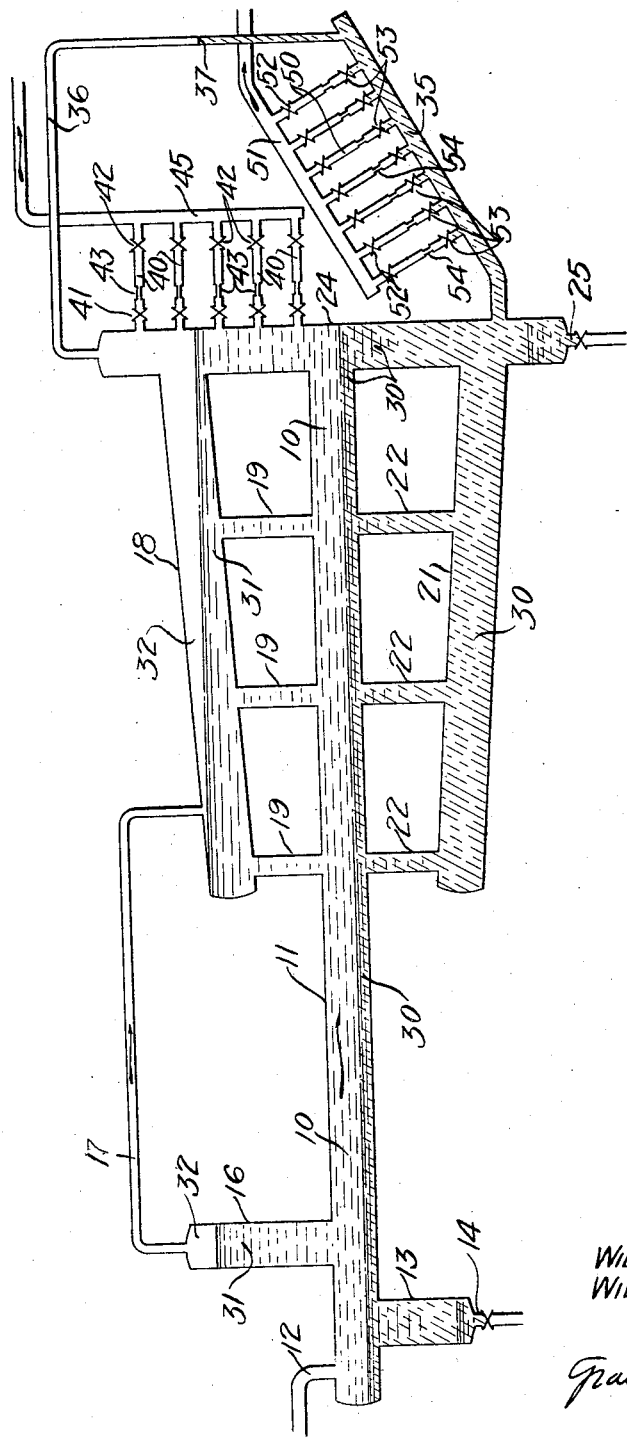

1,559,115

UNITED STATES PATENT OFFICE.

WILLIAM M. MARKER AND WILLIAM R. ALLEN, OF VENTURA, CALIFORNIA.

THROTTLED OUTLET SEPARATOR.

Application filed July 5, 1922. Serial No. 572,924.

*To all whom it may concern:*

Be it known that we, WILLIAM M. MARKER and WILLIAM R. ALLEN, citizens of the United States, residing at Ventura, in the county of Ventura, State of California, have invented a new and useful Throttled Outlet Separator, of which the following is a specification.

Our invention relates to the operation of oil wells and particularly to a device for preventing emulsification of the oil and water which flows from such wells.

The natural petroleum oils as they flow from the well have a tendency to emulsify with the water contained therein when the flow of oil is placed under high velocities or agitated. Considerable difficulty is experienced in separating the water which has combined with the oil in the form of an emulsion, and various devices are employed for breaking down such emulsions. We have found that where the flow from a producing well is maintained at a low velocity, the tendency towards emulsification is not greatly pronounced, and that by introducing the oil well flow into a suitable chamber at low velocity, a stratification of the oil, gas, and water may be accomplished and these different elements drawn separately from the chamber, the difficulties due to emulsification thus being avoided.

The flow from oil wells is generally very irregular due to the presence of gas under high pressure within the well which causes the oil to be produced in heads, and unless means are provided, for restraining the flow of oil from wells, high velocities are produced within the oil sands and the well tubing which often cause emulsification before the product has reached the surface.

We therefore find it desirable to maintain a reacting pressure upon the well, by the use of flow restricting orifices, which will restrain the output to an even flow; and to introduce the water, oil, and gas, constituting the output, into a stratifying chamber under pressure and at low velocity; and to separate the water from the oil and gas before releasing the products from the internal pressure, which is accomplished by discharging them through separate orifices into suitable receptacles provided therefor. Thus the water is allowed to escape through one channel and the oil and gas to escape through another channel without the formation of emulsion which would occur if the oil, gas, and water were to be discharged together through the flow restricting orifices before their separation.

It is the principal object of our invention to provide an apparatus for preventing the emulsification of the water and oil by separating the water by gravity from the oil while it is maintained at a low velocity and from which device the oil and water may be discharged through separate orifices, and to thus solve one of the difficult problems encountered in the production of oil, viz: the reduction of emulsions.

In the drawing which is of an entirely diagrammatic nature and for illustrative purposes only, is shown a horizontal pipe 11 constituting a stratification chamber 10.

The product from a flowing well may be introduced into the stratification chamber 10 through an inlet pipe 12, whereupon the stratification thereof is accomplished as the gas, oil and water flows forwardly at low velocity and under pressure within the chamber 10.

In the bottom of the pipe 11 a sand trap 13 provided with a valved outlet 14 is placed, this sand trap being placed near the inlet 12 so that whatever sand and sediment there is contained in the flow from the well may settle directly thereinto and not be spread out along the bottom of the pipe 11. In order to reduce the amount of fluid which must flow through the length of the pipe 11, a gas dome 16 is provided into which gas may separate from the oil and water. From the top of the dome 16 a pipe 17 leads into the top of an oil and gas header 18 situated above the pipe 11 and connected thereto by risers 19, leading upwardly from the stratification chamber. Below the pipe 11 is a water header 21 which connects with the stratification chamber through risers 22. These headers 18 and 21 are preferably inclined as shown and with pipe 11 are connected into a standpipe 24 which has a sediment outlet 25 situated in the bottom thereof. The product from the well upon entering through the inlet 12 enters the stratification chamber and flowing forwardly therein disposes itself by gravity in the strata of water, oil and gas which are designated as 30, 31, 32 respectively, the oil rising into the header 18 through the risers 19, and the water passing through the risers 22 into the header 21 while the gas rises in the dome 16 and passes out of said dome through pipe 17 into the top of the header 18.

Connected into the standpipe 24 at a position near the bottom thereof so as to tap the water strata is a water discharge header 35 which has a pressure equalizing pipe 36 connecting between the outer end thereof and the top of the standpipe 24. Owing to the weight of the oil 31 which is supported upon the water within the stratification chamber, the risers 19, and the standpipe 24, the water assumes a level 37 within the equalizing pipe 36, this level being slightly lower than the oil level owing to the density of the water being greater than that of the oil.

Extending from the upper part of the standpipe 24 are a number of outlet pipes 40 having valves 41 and 42 placed therein and flow restricting orifices 43 disposed therein between the valves 41 and 42. These outlets 40 lead into an oil and gas discharge manifold 45 which has connection with one of the standard oil and gas separators which are in common use in the oil fields.

Extending upwardly from the water discharge header 35 are a series of water outlets 50 which connect to a water outlet manifold 51. The outlets 50 are provided with valves 52 and 53 and have situated therein flow restricting orifices 54. It will be perceived that the header 35 is situated at an angle. This is done to provide a greater number of outlets 50 for a given vertical rise and thus a finer graduation of the water flow restricting orifices.

The pipe 11 forming the main stratification chamber is proportioned according to the normal flow of the well and although it is shown as one continuous member, it is possible to form same of several pipes disposed in rectangular formation. In the operation of this device a sufficient number of outlets 40 to accommodate the flow of oil and gas are brought into usage by opening the valves 41 and 42 in the necessary outlets, and likewise the water content of the production of the oil well is accommodated by opening valves 52 and 53, thus permitting a flow of water through certain of the orifices 54. The orifices thus provided restrain the flow from the separator and thus determine the velocity of the flow of the well.

By restricting the flow from the stratification chamber as we do by the employment of flow restricting orifices, it is possible to maintain a pressure within the well and the separator which will keep the velocity of the flow considerably below that at which emulsification would take place.

We claim as our invention:

1. In a separator of the class described, the combination of: a substantially horizontal pipe into which the mixture is fed; a gas dome at the forward end of said pipe; a second pipe coextensive with the rearward end of said first pipe; a gas pressure equalizing pipe extending between said gas dome and said second pipe; and tubular means extending between said pipes at suitable intervals whereby communication is established between said first pipe and said second pipe so as to form a stratification chamber of increased volume but having physical strength equal to that of the first pipe.

2. In a separator of the class described, the combination of: a substantially horizontal pipe into which the mixture is fed; a gas dome at the forward end of said pipe; secondary pipes coextensive with the rearward end of said first pipe in substantially the vertical axial plane of said first pipe; a gas pressure equalizing pipe extending between said gas dome and the uppermost of said secondary pipes; tubular means extending between said pipes at suitable intervals whereby communication is established between said first pipe and said secondary pipes so as to form a stratification chamber of increased volume but having physical strength equal to that of the first pipe; a vertical standpipe forming a header connected across the ends of said pipes; and regulatable flow controlling means for discharge of fluids from the various levels of said header.

3. In a separator of the class described, the combination of: a substantially horizontal pipe into which the mixture is fed; a gas dome at the forward end of said pipe; secondary pipes coextensive with the rearward end of said first pipe in substantially the vertical axial plane of said first pipe; a gas pressure equalizing pipe extending between said gas dome and the uppermost of said secondary pipes; tubular means extending between said pipes at suitable intervals whereby communication is established between said first pipe and said secondary pipes so as to form a stratification chamber of increased volume but having physical strength equal to that of the first pipe; a vertical standpipe forming a header connected across the ends of said pipes; and regulatable flow controlling means for discharge of fluids from the various levels of said header, each of said means consisting of a group of orifice members and valve means communicating with each of said orifice members whereby each of said orifice members may be independently put in or cut from service.

4. In a separator of the class described, the combination of: a substantially horizontal pipe into which the mixture is fed; a sand trap at the forward end of said pipe; a gas dome at the forward end of said pipe; a second pipe coextensive with the rearward end of said first pipe; a gas pressure equalizing pipe extending between said gas dome and said second pipe; and tubular means extending between said pipes at suitable intervals whereby communication is established between said first pipe and said second pipe so as to form a stratification chamber of increased volume, but having physical strength equal to that of the first pipe.

5. In a separator of the class described, the combination of: a substantially horizontal pipe into which the mixture is fed; a sand trap at the forward end of said pipe; a gas dome at the forward end of said pipe; secondary pipes coextensive with the rearward end of said first pipe in substantially the vertical axial plane of said first pipe; a gas pressure equalizing pipe extending between said gas dome and the uppermost of said secondary pipes; tubular means extending between said pipes at suitable intervals whereby communication is established between said first pipe and said secondary pipes so as to form a stratification chamber of increased volume, but having physical strength equal to that of the first pipe; a vertical standpipe forming a header connected across the ends of said pipes and having a sediment outlet in the bottom thereof; and regulatable flow controlling means for discharge of fluids from the various levels of said header.

In testimony whereof, we have hereunto set our hands at Ventura, California, this 28th day of June, 1922.

WILLIAM M. MARKER.
WILLIAM R. ALLEN.